United States Patent Office 3,202,684
Patented Aug. 24, 1965

3,202,684
17α-CHLORETHYNYL STEROIDS AND PROCESS
FOR THEIR PREPARATION
Derek Burn, Peter Feather, and Vladimir Petrow, London, England, assignors to The British Drug Houses Limited
No Drawing. Filed Feb. 19, 1963, Ser. No. 259,732
Claims priority, application Great Britain, Feb. 23, 1962, 7,119/62
12 Claims. (Cl. 260—397.5)

This invention is for improvements in or relating to organic compounds and has particular reference to a class of steroidal materials, namely the 17α-chlorethynyl-17β-hydroxy derivatives of perhydrocyclopentenophenanthrene and to a process for their preparation.

The new compounds of the present invention have valuable biological properties or may be readily converted into compounds having valuable biological properties. Thus they have hormonal properties including oestrogenic, progestational, ovulation-inhibiting and claudogenic (see Petrow, J. Pharm. Pharmacol, 1960, 12, 704) properties. In particular they are of value on account of their claudogenic properties.

Compounds having such properties are valuable in the veterinary field particularly for application to the dog and cat species. Thus unwanted litters in, for example, sheep dogs and pedigree animals and sometimes in domestic pets can be disadvantageous. By administration of one of the claudogenic compounds of the present invention the appearance of such unwanted litters may be prevented. Similarly in cats the administration of claudogenic compounds is often of value. Not only does such administration prevent the appearance of unwanted litters, but it eliminates the need for castration so that normal reproduction can take place if subsequently desired.

The claudogenic compounds of the present invention are of great value for the control of infestation by domestically-encountered rodents especially rats and mice. For example, the 3-methyl derivative of 17α-chlorethynyl-oestradiol may be administered for this purpose in a suitable bait. An advantage of the claudogenic compounds of the present invention over the hitherto available rat and mouse poisons is the virtual absence of toxicity to domestic animals if the treated bait is accidentally consumed. This form of "claudogenic control" is an important advance in the control of rodent infestation.

Our copending application Ser. No. 127,805, filed July 31, 1961, discloses new 17α-chlorethynyl steroids having, apart from substituents and unsaturated linkages in rings A, B, C and D, the general formula

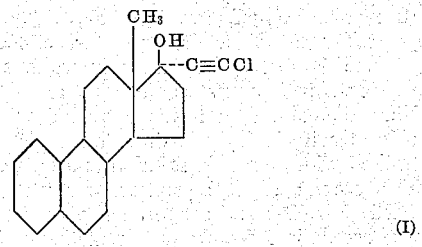

(I)

and a process for their preparation.

It is an object of the present invention to provide certain new 17α-chlorethynyl steroids having the general Formula I above and an alternative method for their preparation.

According to the present invention there is provided a process for the preparation of 17α-chlorethynyl steroids having, apart from substituents and unsaturated linkages in rings A, B, C and D, the general Formula I, which process comprises reacting a corresponding 17-oxo-steroid in liquid ammonia with a chloracetylide of an alkali or alkaline earth metal and subsequently regenerating the desired derivative from the complex so formed. Sodium is the preferred metal. The alkali or alkaline earth metal chloracetylide may be prepared by the addition of a solution of cis- or trans-1,2-dichlorethylene in an organic solvent such, for example, as ether to a solution of the amide of the alkali or alkaline earth metal in liquid ammonia. Trans-dichlorethylene is the preferred reactant.

The 17-oxo steroidal starting material may then be added in a non-hydroxylic organic solvent such, for example, as ether or dioxan, or toluene, or tetrahydrofuran, and the reaction may be completed by stirring the mixture at about the boiling point of liquid ammonia for 1 to 5 hours. The complex may then be decomposed by the addition of, for example, an acid salt such as ammonium chloride, and the ammonia allowed to evaporate. The steroidal product may be isolated from the residue by standard techniques well known to those skilled in the art.

It will be apparent to those skilled in the art that the process of the invention may be applied to steroids containing, in addition to the oxo-group at $C_{17}$, a variety of substituents and unsaturated linkages in rings A, B, C and D. Thus, the process of the invention may be applied to steroids containing unsaturated linkages at $\Delta^1$, $\Delta^3$, $\Delta^4$, $\Delta^{5(6)}$, $\Delta^{9(11)}$ and $\Delta^{11(12)}$, and to combinations of unsaturated linkages such, for example, as at $\Delta^2$ and $\Delta^{5(10)}$. In addition, the process may be applied to steroids containing 3 or more unsaturated linkages, together forming an aromatic system. Hydroxyl groups do not interfere with the process of the invention, in particular, hydroxyl groups at positions 3, 4, 5, 6 and 11. Hydroxyl groups may, however, be advantageously protected by prior conversion into tetrahydropyranyl derivatives and subsequently regenerated. Acyl groups may be hydrolysed during the course of the reaction with sodium chloracetylide, and may require subsequent regeneration. Alkyl, alkenyl and alkynyl groups containing up to five carbon atoms such, for example, as methyl, vinyl and propynyl groups, and in particular, methyl groups at $C_2$, $C_4$ and $C_6$, do not interfere with the process of the invention.

Oxo-groups at $C_3$, $C_4$ or $C_6$ require protection by for example ketal, enamine or enol ether formation and subsequent regeneration. The 17α-chlorethynyl - 17β - hydroxy enol ethers of 3-oxo-$\Delta^4$-steroids obtained in this way may also be of value in their own right on account of their biological properties. Sterically hindered oxo-groups, such as at $C_{11}$ when an unsaturated linkage is present in the molecule at $C_4$ or $C_5$, will in general, prove unreactive. 5,6-epoxide groups do not interfere with the process of the invention.

The process of the invention is particularly applicable to derivatives of androstane represented as general Formulae II, III, IV and V, of oestrane represented by general Formulae VI and VII

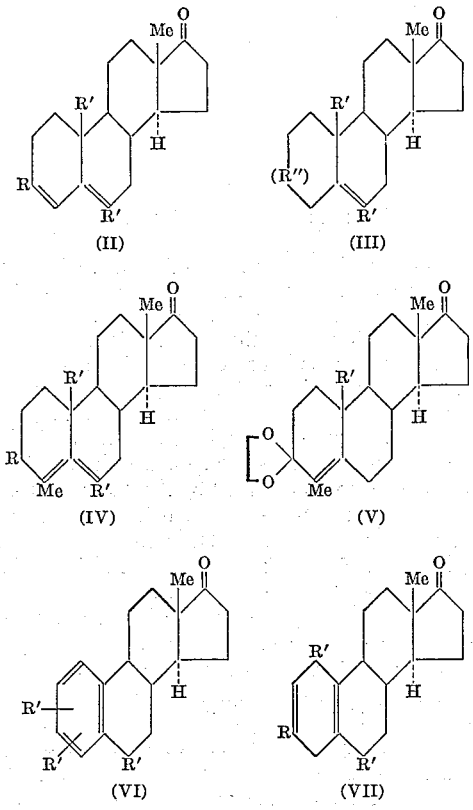

where

R is OX (where X is lower alkyl, cyclic alkyl or benzyl) or H
R' is Me or H
R" is CHOH, CHOAcyl,

In a typical preparation of a 17α-chlorethynyl steroid containing a 3-oxo-4-ene grouping and a 17-oxo-group, a 3-ketal may first be prepared by heating with an excess of ethylene glycol in the presence of p-toluene sulphonic acid, the water formed in the reaction being continuously removed (cf. Herzog, Jevnik, Tully and Hershberg, J. Amer. Chem. Soc., 1953, 75, 4425). The resulting ketal is then treated with sodium chloracetylide. The ketal group is removed by hydrolysis usually in presence of an acid catalyst yielding the 17α-chlorethynyl-17β-hydroxy-androst-4-en-3-one derivative.

Alternatively, a 17β-hydroxy-3-oxo-Δ⁴-steroid may be converted into a derivative such as a 3-ketal or 3-enol ether and the secondary hydroxylic group at C₁₇ converted into a 17-oxo group by oxidation with, for example, chromic acid/pyridine. The 17-oxo-3-ketalised steroid thereby obtained may then be condensed with sodium chloracetylide as described above.

A procedure applicable to and particularly convenient for 3,17-dioxo-Δ⁴-steroids is to convert them into the 3-enol ether-17-ones by methods of prior art and to condense these materials with sodium chloracetylide, subsequently regenerating the 3-oxo-Δ⁴-system by treatment with H⁺ ions.

In the preparation of the 3-oxo-Δ⁴-derivatives of 17α-chlorethynyl-19-nor-androstane, the corresponding oestra-2,5(10)-dien-3-ol-17-one-3-methyl ether may be treated with sodium chloracetylide according to the process of the invention. Warming with a mineral acid then regenerates the 3-oxo-4-ene grouping.

In certain cases it may be advantageous to reduce an oxo group (other than at C₁₇) to hydroxyl and subsequently to regenerate it by oxidation.

The present invention provides veterinary preparations of the new 17α-chlorethynyl-17β-hydroxy steroidal derivatives. Oral forms of administration are preferred to injectable preparations. In particular the products of the invention may be administered as tablets or as food additives.

Following is a description by way of example of methods of carrying the invention into effect.

EXAMPLE 1

*17α-chlorethynyl-3-methoxy-oestra-1,3,5(10)-trien-17β-ol*

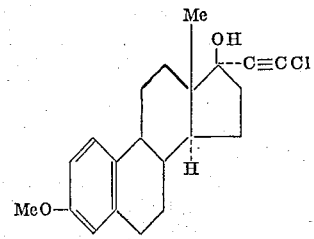

Sodium (4.0 g.) and ferric nitrate (0.1 g.) were added to liquid ammonia (300 ml.) and the mixture was stirred under reflux until the blue colour disappeared. The mixture was then cooled to −60° C. and a solution of trans-dichloroethylene (8.45 g.) in anhydrous ether (25 ml.) was added during 15 minutes. The cooling-bath was removed and the mixture was stirred under reflux for 30 minutes. A suspension of oestrone-3-methyl ether (12.5 g.) in anhydrous tetrahydrofuran (150 ml.) was added during 15 minutes, and the mixture was stirred under reflux for 3 hours. Solid ammonium chloride (20 g.) was added, the ammonia was allowed to evaporate, and the residue was added to water (400 ml.). Ether extraction, the ethereal solution being washed with water, dried over sodium sulphate, treated with charcoal and evaporated at reduced pressure, yielded a gum which solidified on standing. Purification from acetone/hexane gave 17α-chlorethynyl-3-methoxy-oestra-1,3,5(10)-trien-17β-ol, M.P. 166.5° C., which is of value on account of its oestrogenic and claudogenic properties.

EXAMPLE 2

*3-diethylaminoethyl ether of 17α-chlorethynyloestra-1,3,5(10)-trien-3,17β-diol*

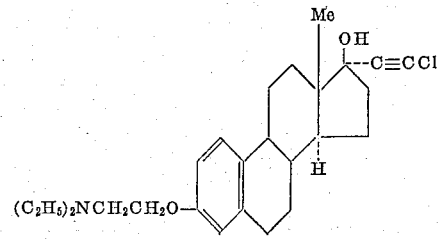

Oestrone (5.4 g.), diethylaminoethyl bromide (7.5 g.) (Meyer and Hopff, Ber. 1921, 54, 2279) and anhydrous potassium carbonate (7.5 g.) were added to anhydrous acetone (100 ml.) and the mixture was refluxed, with stirring, for 8 hours, cooled and extracted with ether. The ethereal solution was extracted with 10% hydrochloric acid, and the hydrochloric acid layer was neutralised with ammonia solution and extracted with ether. This second ethereal solution was washed with water, dried (Na₂SO₄) and evaporated to dryness. The residue was crystallised from aqueous methanol, yielding the 3-diethylaminoethyl ether of oestrone, M.P. 79 to 80° C. $[\alpha]_D^{23}$ +122° (c., 1.088 in dioxan A.R.)

$\lambda_{max.}^{EtOH}$ 279 mμ (ε 2080) 287 mμ (1960)

This compound (3.23 g.) was converted, by the method of Example 1 into 3-diethylaminoethyl ether of 17α-chlorethynyl-oestra-1,3,5(10)-trien-3,17β-diol $\lambda_{max}^{EtOH}$ 278.5 mμ (ε 2060) 287 mμ (ε 1880) $\gamma_{max}^{CCl_4}$ 3615, 2215 1611, 1498, 1474, 1458, 1384, 1291, 1282, $\gamma_{max}^{Nujol}$ 2206, 1612, 1577, 1500, 1252, 1235, 1071, 1057, 1048, 736 which has claudogenic activity.

EXAMPLE 3

*17α-chlorethynyl-2-chloro-4-methyl-oestra-1,3,5(10)-trien-17β-ol*

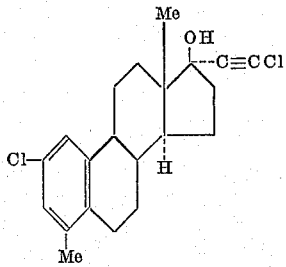

To a stirred solution of 17α-acetoxy-androsta-1,4-dien-3-one (10.0 g.) in anhydrous ether (600 ml.) at −35° C., was added, during 20 minutes, a solution of chlorine in propionic acid (10% w./v.; 24 ml.). The ethereal solution was stirred at −35° C. for 7 hours, and then washed with sodium bicarbonate solution until alkaline, washed with water until neutral, dried over sodium sulphate and the solvent evaporated. Trituration of the residue with methanol yielded 3.52 g. of a colourless solid. This was dissolved in pyridine (18 ml.) and the solution was allowed to stand at room temperature for 45 minutes. Ether extraction, washing with dilute hydrochloric acid, sodium bicarbonate solution and water, drying over sodium sulphate and evaporation of the solvent yielded 2-chloro-17β-acetoxy-androsta-1,4-dien-3-one purified from methylene chloride/hexane, M.P. 184 to 184.5° C., [α]$_D^{27}$ −11° (c., 0.89 in CHCl$_3$AR) λ$_{max}$. 250.5 mμ (ε 15,968).

2-chloro-17β-acetoxy-androsta-1,4-dien-3-one (2.85 g.) was dissolved in anhydrous ether (200 ml.) and added during 15 minutes to a stirred suspension of lithium aluminium hydride (2.9 g.) in anhydrous ether (115 ml.). The mixture was heated for 10 minutes under reflux and then treated with acetone and extracted with ether, washed with water and dried over sodium sulphate. The residue from evaporation of the ether was dissolved in a mixture of glacial acetic acid (450 ml.) and water (100 ml.), and the solution was boiled under reflux for 1 minute and allowed to cool. The precipitate which formed was collected and purified from methanol, and consisted of 2-chloro-4-methyl-oestra-1,3,5(10)-trien-17β-ol, M.P. 147.5 to 148° C., [α]$_D^{25}$ +88.5° (c., 0.641 in CHCl$_3$AR). A solution of 2-chloro-4-methyloestra-1,3,5(10)-trien-17β-ol (1.0 g.) and cyclohexanone (10 ml.) in anhydrous toluene (50 ml.) was treated with a solution of aluminium isopropoxide (0.5 g.) in anhydrous toluene (10 ml.) and the mixture was refluxed under nitrogen for 1 hour, cooled and shaken with 15 ml. of saturated Rochelle salt solution. The solvent was removed by steam-distillation and the solid which formed was collected and purified from acetone/hexane as 2-chloro-4-methyl-oestra-1,3,5(10)-trien-17-one, M.P. 209 to 209.5° C., [α]$_D^{265}$ +145.3° (c., 0.95 in CHCl$_3$AR).

This compound (0.55 g.) was converted by the method of Example 1 into 17α-chlorethynyl-2-chloro-4-methyl-oestra-1,3,5(10)-trien-17β-ol, purified by chromatography on alumina, eluting with benzene containing 10% of ether and by crystallisation from aqueous methanol [α]$_D$ −32° (c., 0.94 in CHCl$_3$AR) λ$_{max}$. 272 mμ (ε 450) and 280.5 mμ (ε 375).

$\gamma_{max}^{CCl_4}$ 3611, 2215, 1465, 1382 $\gamma_{max}^{CS_2}$ 1062, 1030, 1026, 863 $\gamma_{max}^{CH_2Cl_2}$ 1582, 1576, 1570. The compound has claudogenic activity.

EXAMPLE 4

*17α-chlorethynyl-1,6-dimethyloestra-1,3,5(10),6-tetraene-3,17β-diol*

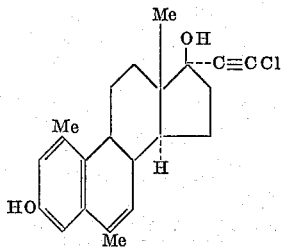

The process of Example 1 was applied to 1,6-dimethyl-3-hydroxyoestra-1,3,5(10),6-tetraen-17-one (1 g.) (prepared as described in Example 1 of British Patent No. 853,012) to yield 17α-chlorethynyl-1,6-dimethyloestra-1,3,5(10),6-tetraene-3,17β-diol as needles (from aqueous acetone), M.P. 190 to 193° C., [α]$_D^{24}$ −191° (c., 0.95 in chloroform), which has claudogenic activity.

EXAMPLE 5

*17α-chlorethynyl-1,6β-dimethyloestra-1,3,5(10)-triene-3,17β-diol*

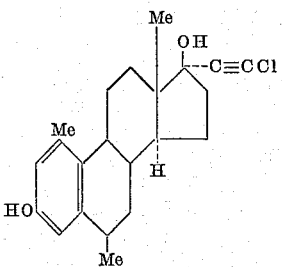

The process of Example 1 was applied to 1,6β-dimethyl-3-hydroxyoestra-1,3,5,(10)-trien-17-one (1.5 g.) (prepared as described in Example 2 of British Patent No. 853,012) to yield 17α-chloroethynyl-1,6β-dimethyloestra-1,3,5(10)-triene-3,17β-diol as needles from aqueous acetone, M.P. 145 to 146° C., [α]$_D^{22}$ +2.2° (c., 0.85 in chloroform), which has claudogenic activity.

EXAMPLE 6

*17α-chlorethynyl-1,6α-dimethyloestra-1,3,5(10)-triene-3,17β-diol*

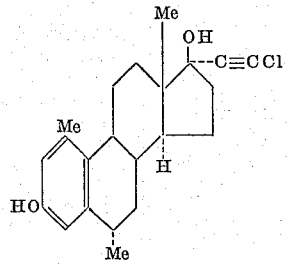

The process of Example 1 was applied to 1,6α-dimethyl-3-hydroxyoestra-1,3,5,(10)-trien-17-one (2.2 g.) (Burn, Petrow and Weston, J. Chem. Soc., 1962, 29) to yield 17α-chlorethynyl-1,6α-dimethyloestra-1,3,5(10)-triene-3,17β-diol as an amorphous solid $\lambda_{max}^{EtOH}$ 285 mμ (ε 1,963)

and end adsorption <245mμ, [α]$_D$ +16.3° (c., 1.0 in chloroform) which has claudogenic activity.

EXAMPLE 7

*17α-chlorethynyl-4,6α-dimethyloestra-1,3,5(10)-triene-1,17β-diol*

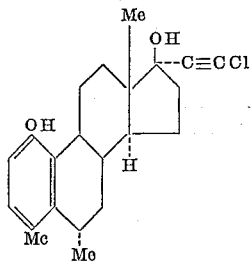

The process of Example 1 was applied to 4,6α-dimethyl-1-hydroxyoestra-1,3,5(10)-trien-17-one (1.8 g.) (Burn, Petrow and Weston, J. Chem Soc., 1962, 29) to yield 17α-chlorethynyl-4,6α-dimethyloestra - 1,3,5(10)- triene-1,17β-diol as flakes from acetone, M.P. 110 to 112° C., $[α]_D^{26}$ +73° (c., 0.95 in chloroform) which has claudogenic activity.

EXAMPLE 8

*17α-chlorethynyl-1-methyloestra-1,3,5(10)-trien-17β-ol*

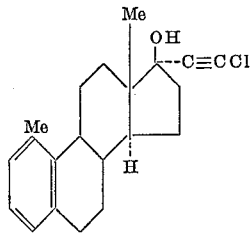

A mixture of 3-hydroxy-1-methyloestra-1,3,5(10)-trien-17-one (Djerassi, Rosenkranz, Romo, Pataki and Kaufmann, J. Amer. Chem. Soc., 1950, 72 4540) (3.6 g.), 1 N sodium hydroxide (14 ml.) ethanol (7 ml.) and tetraethyl pyrophosphate (3.3 ml.) was kept overnight at room temperature and poured into dilute aqueous sodium hydroxide. The organic material was extracted into ether and dried over anhydrous sodium sulphate. The residue left on evaporation of the ether was dissolved in tetrahydrofuran (25 ml.) and liquid ammonia (125 ml.) and lithium (ca. 0.2 g.) was added until a permanent blue colour was obtained. The colour was discharged by dropwise addition of ethanol and the ammonia was allowed to evaporate. The organic material was extracted into ether, the extract was washed with dilute aqueous hydrochloric acid, dilute aqueous sodium hydroxide and water, dried over anhydrous sodium sulphate and evaporated to dryness. The residue, in acetone (50 ml.) was treated with a solution of chromic trioxide (2.67 g.) in water (10 ml.) and concentrated sulphuric acid (2.3 ml.) until a permanent red colour was obtained (ca. 1 ml.) and the mixture was poured into water. The product was isolated with ether and crystallised from aqueous methanol to give 1-methyloestra-1,3,5(10)-trien-17-one as laths, M.P. 164 to 166° C., $[α]_D^{22}$ +268° (c., 1.0 in chloroform).

The foregoing ketone (1 g.) was treated by the process of Example 1 to yield 17α-chlorethynyl-1-methyloestra-1,3,5(10)-trien-17β-ol as needles (from methanol), M.P. 71 to 74° C., $[α]_D^{26.5}$ +28.1° (c., 1.0 in chloroform) which has claudogenic activity and oestrogenic activity.

EXAMPLE 9

*17α-chlorethynyloestra-1,3,5(10)-trien-17β-ol*

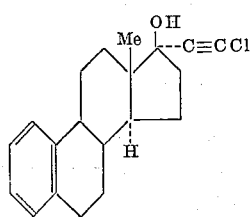

The process of Example 1 was applied to oestra-1,3,5(10)-trien-17-one (2 g.) (U.S. Patent No. 2,947,763) to yield 17α-chlorethynyloestra - 1,3,5(10) - trien-17β-ol as plates from aqueous methanol, M.P. 59 to 60° C., $[α]_D^{25}$ −17° (c., 1.0 in chloroform), which has claudogenic and oestrogenic activity.

EXAMPLE 10

*17α-chlorethynyl-4-methyloestra-1,3,5(10)-trien-17β-ol*

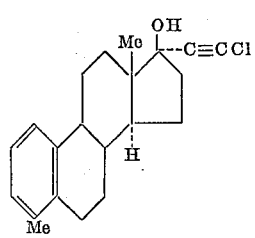

The process of Example 1 was applied to 4-methyloestra-1,3,5(10)-trien-17-one (1 g.) (Gentles, Moss, Herzog and Hershberg, J. Amer. Chem. Soc., 1958, 80, 3702) to yield 17α - chlorethynyl - 4 - methyloestra-1,3,5(10)-trien-17β-ol as needles from acetone/hexane, M.P. 132 to 132.5° C., $[α]_D^{26}$ −18.5° (c., 0.97 in chloroform) which has claudogenic and oestrogenic activity.

EXAMPLE 11

*17α-chlorethynyl-1,6β-dimethyloestra-1,3,5(10)-trien-17β-ol*

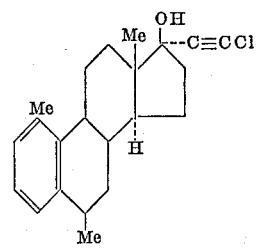

A mixture of 1,6β-dimethyl-3-hydroxyoestra-1,3,5(10)-trien-17-one (prepared as described in Example 2 of British specification No. 853,012) (15 g.), sodium hydroxide (2.8 g.), water (20 ml.), ethanol (10 ml.) and tetraethyl pyrophosphate (20 g.) was kept overnight at room temperature and then poured into dilute aqueous sodium hydroxide. The organic material was extracted into ether, the extract was washed with water and dried over anhydrous sodium sulphate and the solvent was evaporated under reduced pressure. The residue was dissolved in ether (500 ml.) and liquid ammonia (400 ml.) and lithium (1.1 g.) was added in small pieces. After stirring for ½ hour, the blue colour was discharged by the addition of solid ammonium chloride and the ammonia was allowed to evaporate overnight. The organic material was extracted into ether, the extract was washed with water, dried over anhydrous sodium sulphate, and evaporated to dryness under reduced pressure. The residue, in acetone (150 ml.), was treated with a solution of chromium trioxide (1.67 g.) in water (10 ml.) and concentrated sulphuric acid (2.3 ml.) until a permanent red colour was obtained (ca. 6 ml.) and the mixture was poured into water. The product was isolated with ether and crystallised from acetone and hexane to give 1,6β-dimethyloestra-1,3,5(10)-trien-17-one as needles, M.P. 187 to 189° C., $[α]_D^{22}$ +207° (c., 0.65 in chloroform).

The foregoing ketone (5 g.) was treated by the process of Example 1 to give 17α-chlorethynyl - 1,6β - dimethyloestra-1,3,5(10)-trien-17β-ol as needles from aqueous methanol, M.P. 124 to 126° C., $[α]_D^{20}$ +3.8° (c., 0.85 in chloroform), which had claudogenic activity.

We claim:
1. A process for the preparation of 17α-chlorethynyl steroids having, apart from substituents in rings A, B, C and D, the formula

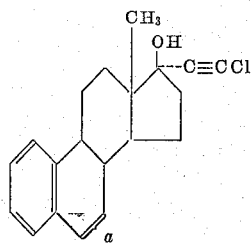

wherein $a$ is a single or double bond, which process comprises reacting a corresponding 17-oxo-steroid in liquid ammonia with a chloracetylide of a metal selected from the group consisting of alkali and alkaline earth metals and subsequently regenerating the desired derivative from the complex so formed.

2. A process as claimed in claim 1 wherein the alkali metal is sodium.

3. A process as claimed in claim 1 wherein the metal chloracetylide is prepared by the addition of a solution of trans-1,2-dichlorethylene in an organic solvent to a solution of the amide of the metal in liquid ammonia.

4. A process as claimed in claim 1 wherein the 17-oxo steroidal starting material is dissolved in tetrahydrofuran.

5. 3 - diethylaminoethyl ether of 17α - chlorethynyl-oestra-1,3,5(10)-trien-3,17β-diol.

6. 17α - chlorethynyl - 2 - chloro - 4 - methyl - oestra-1,3,5(10)-trien-17β-ol.

7. 17α - chlorethynyl - 1,6 - dimethyloestra - 1,3,5(10), 6-tetraene-3,17β-diol.

8. 17α - chlorethynyl - 1,6β - dimethyloestra-1,3,5(10)-triene-3,17β-diol.

9. 17α - chlorethynyl - 1,6α - dimethyloestra-1,3,5(10)-triene-3,17β-diol.

10. 17α - chlorethynyl - 4,6α-dimethyloestra-1,3,5(10)-triene-1,17β-diol.

11. 17α - chlorethynyl - 1 - methyl - oestra - 1,3,5(10)-trien-17β-ol.

12. 17α - chlorethynyl - 1,6β - dimethyl - oestra - 1,3,5(10)-trien-17β-ol.

References Cited by the Examiner

Fried et al.: J.A.C.S. 83, pp. 4663–64 (1961).

LEWIS GOTTS, *Primary Examiner*.